Dec. 2, 1947.   M. G. NICHOLSON, JR   2,432,033
COMPENSATION FOR BATTERY VOLTAGE CHANGES IN RADIO RECEIVERS
Filed Oct. 4, 1944
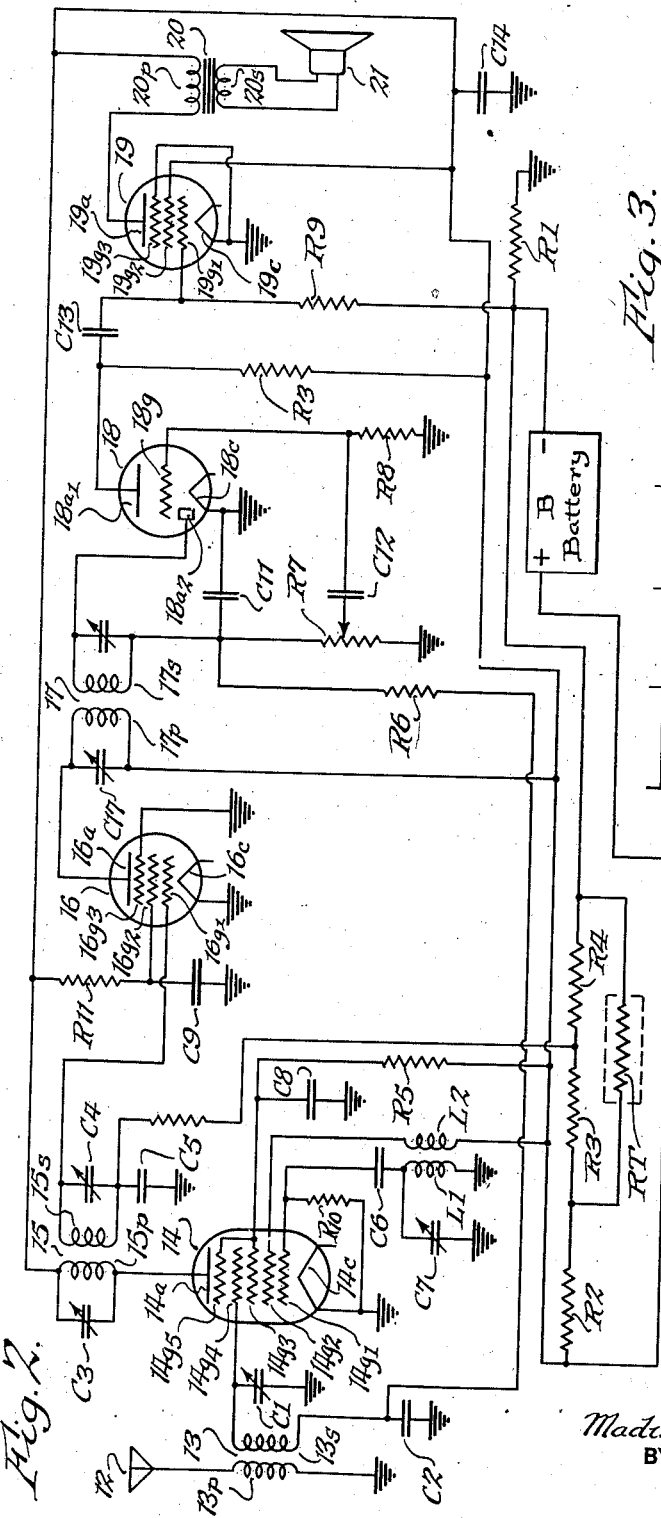
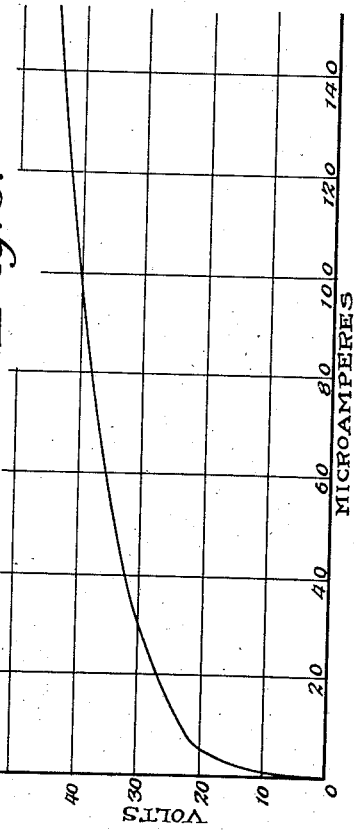
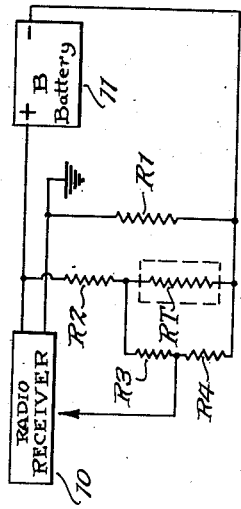
INVENTOR
Madison G. Nicholson, Jr.
BY C. Q. Norton
ATTORNEY Patented Dec. 2, 1947

2,432,033

UNITED STATES PATENT OFFICE 2,432,033

COMPENSATION FOR BATTERY VOLTAGE CHANGES IN RADIO RECEIVERS

Madison G. Nicholson, Jr., Snyder, N. Y., assignor to Colonial Radio Corporation, Buffalo, N. Y.

Application October 4, 1944, Serial No. 557,193

6 Claims. (Cl. 250—20)

This invention relates to compensation for battery voltage changes in radio receivers, and more particularly to battery-operated radio receivers so constructed and arranged that the sensitivity of the receiver is maintained substantially constant regardless of the voltage of the batteries throughout their useful life.

It is well known that the A and B batteries ordinarily used for operating battery receivers progressively decrease in the voltage and current which they will supply with the amount of use and age of the batteries. This decrease in voltage reduces the sensitivity of the receiver, and is evidenced by an inability to receive signals from stations which are easily received when the batteries are fresh.

Since receivers of this type are usually used in remote localities where the field strength of signals is low, this constitutes a serious drawback to the operation of such receivers and requires that if the full sensitivity of the receiver is to be enjoyed, the operator must replace batteries long before their useful life is over.

The useful life of a battery as herein referred to is considered to be that period during which the battery provides a voltage of two-thirds or more of its initial or fresh value. Thus, useful life of a B battery initially delivering 90 volts is considered to be finished when the battery drops to a voltage less than 60 volts.

It is an object of this invention to provide a radio receiver, the sensitivity of which will remain substantially unchanged during the useful life of the batteries.

It is a further object of this invention to provide a receiver in which the sensitivity will remain substantially constant during the useful life of the batteries, and in which no bias batteries are required, all of the biasing voltages being derived from voltage drops through resistors in the circuit.

It is a further object of this invention to provide a radio receiver of the class described in which the compensation for decreasing battery voltage is not subject to deterioration from age or climatic conditions.

Still other objects and advantages of my invention will be apparent from the specification.

The features of novelty which I believe to be characteristic of my invention are set forth with particularity in the appended claims. My invention itself, however, both as to its fundamental principles and as to its particular embodiments, will best be understood by reference to the specification and accompanying drawing, in which Fig. 1 is a simplified schematic diagram illustrating the principles of my invention, Fig. 2 is a circuit diagram of a radio receiver according to my invention, and Fig. 3 is a curve showing the characteristics of the special resistor which I employ in accordance with my invention.

In a battery receiver of conventional design, the amplification in radio frequency or intermediate frequency stages will steadily drop as the battery voltage decreases. I overcome this difficulty by providing means for increasing the amplification or gain of one or more of the radio frequency or intermediate frequency amplifier tubes as the battery voltage decreases.

In order to do this, the receiver is so designed that the tube or tubes in question have a large reserve of amplification or gain. This amount of amplification or gain cannot be utilized with fresh batteries because it may be sufficient to introduce instability or oscillation. Therefore, I overbias these tubes when the batteries are fresh, reducing the gain to a permissible value which does not interfere with stable and reliable operation, but does afford all of the amplification or gain which the receiver is capable of utilizing, and I provide means for automatically decreasing this bias at a rate substantially greater than the rate of decrease of the battery voltage.

In other words, as the battery voltage decreases, this reserve of amplification or gain is drawn on automatically to a greater degree until, as the batteries are approaching the end of their useful life, the tube or tubes so controlled are delivering at or near the maximum gain or amplification of which they are capable, thus compensating for the decrease in gain or amplification of the uncompensated tubes; and maintaining the overall sensitivity of the receiver at a substantially constant level. A receiver so arranged is able to receive all the signals even with batteries almost at the point of exhaustion which it would receive with the batteries fresh.

In practicing my invention, I employ one or more special resistances having a non-linear voltage-current characteristic whose resistance value changes rapidly with the change in applied voltage or current. This special resistor, or resistors, is employed to obtain a negative bias voltage which is applied to the control circuit of the tube or tubes to be compensated.

Such special resistance may be made by pressing silicon carbide with a suitable ceramic binder at high pressure, followed by firing at a high temperature and is obtainable under the name "Thyrite." As an example but not in limitation, a suitable resistance is that listed under General Electric catalog number 838611G1, having a characteristic such as shown in Fig. 3. From this curve it will be seen that, as the applied voltage across such a resistance is increased above zero to the neighborhood of 20 volts, the current increases quite slowly.

In the example given, a voltage of 20 volts produces a current of only approximately 5 microamperes. An increase in voltage of 50%; i. e., to 30 volts, produces a six-fold increase in current, or approximately 30 microamperes, and a further increase of 10 volts, or 33⅓% increase, produces a five-fold increase in current, or approximately 150 microamperes.

In accordance with my invention I utilize the portion of the curve of Fig. 3 which is nearly flat, but, since the voltages which are available in this range are not suitable for application as bias voltages to the tubes, I employ the circuit shown in simplified form in Fig. 1. In this figure 10 represents the radio receiver, 11 the B battery, and R1 a resistor placed in the negative return of the B battery, and of such value that it may be used for the bias voltage for the output amplifier tube or tubes, in addition to serving its part in the special bias network in accordance with my invention.

As an example, if the output tube is of type 1LB4, the value of R1 would be such that the voltage across it would be about 8 volts for a B battery voltage of 90. When the B battery voltage has dropped to 60 volts, the voltage across R1 would be about 5.5 volts.

Connected in series with the B battery, I may provide resistances R2 and RT in series, resistance R2 being a conventional or linear resistor and resistance RT being a non-linear resistor such as already described. Resistance RT may be shunted by resistances R3 and R4 in series, both of these being of the conventional type, and the compensation bias voltage may be taken from the common point of resistances R3 and R4 (which form a voltage divider) and applied to the grids of the tubes to be compensated.

Resistor R2 may satisfactorily be about 470,000 ohms and the sum of resistances R3 and R4 may be assumed to be about 5 megohms, in order to more easily calculate the voltage distribution in the network. When the B battery voltage is 90 volts, the voltage across the special resistor RT will be 40 volts as calculated from Fig. 1 and the values of resistance assumed for the rest of the network. For a B battery voltage of 60 volts, the voltage across RT drops only to 34 volts.

Since maximum gain of the compensated tubes is obtained at approximately 0.5 volt negative bias, the ratio of R3 to R4 is so chosen that for a B battery voltage of 60 volts this bias will be delivered. Since the voltage across R1 is 5.5 volts, under these conditions the voltage across R4 should be 5.0 volts; thus, $$R_4 = \frac{5.0}{34-5.0} \times R_3$$

Since the sum of R3 and R4 has been assumed to be about 5 megohms, R3 should be about 4.2 megohms and R4 about 0.75 megohm.

This will give a compensating bias of −0.5 volt for a B battery voltage of 60 volts, while for a B battery voltage of 90 volts the bias voltage is −2.0 volts. This control voltage may be applied to the control grids of the I. F. or R. F. tube or tubes, while the A. V. C. voltage may be applied to the frequency converter tube in the usual manner.

Thus, for fresh batteries it will be seen that while the receiver has the maximum usable sensitivity (i. e., the receiver will work to the noise level of signals) the compensated tube or tubes have a large reserve of sensitivity, and as the battery voltage drops, this sensitivity is increasingly drawn on to compensate for loss of sensitivity in the uncompensated tubes, and for all practical purposes the receiver does not lose sensitivity as the batteries age.

Referring now more particularly to Fig. 2, the receiver may comprise antenna 12 coupled to the input circuit by transformer 13, having primary winding 13p in the antenna circuit and secondary winding 13s in the input circuit of the first tube 14. The input circuit may be tuned by variable condenser C1 connected between the high side of secondary 13s and ground, and the low side of 13s may be connected to ground through condenser C2.

The first tube 14 may be a pentagrid converter such as type 1LA6, having cathode $14c$, first converter grid $14g_1$, second converter grid $14g_2$, screen grid $14g_{3-5}$, control grid $14g_4$, and anode $14a$. Cathode $14c$ may be connected to ground and through resistor R10 to first converter grid $14g_1$, which may be connected through condenser C6 to one terminal of variable condenser C7, the other terminal of which may be connected to ground. Converter second grid $14g_2$ may be connected to +B through inductance L2, which is coupled to inductance L1 in shunt with condenser C7. This construction forms an oscillator, as will be readily understood, generating heterodyning oscillations.

Control grid $14g_4$ may be connected to the common point of inductance 13s and condenser C2. Screen grid $14g_{3-5}$ may be connected through resistance R5 to +B and by-passed to ground by condenser C8. Anode $14a$ may be connected through primary 15p of transformer 15 and to +B, and primary 15p may be shunted by condenser C3.

Currents of intermediate frequency derived from the output of tube 14, which acts as first detector as well as oscillator, may be impressed upon intermediate frequency amplifier tube 16, which may be a pentode of type 1P5G, having cathode $16c$, control electrode $16g_1$, screen $16g_2$, and suppressor $16g_3$, and anode $16a$. The control electrode may be connected to the common point of inductance 15s and condenser C4 and the cathode connected to ground.

Screen $16g_2$ may be connected to +B through resistor R11 and to ground through condenser C9. Suppressor $16g_3$ may be connected to ground and anode $16a$ may be connected through inductance 17p primary of transformer 17 shunted by condenser C17 to +B.

The output of the tube 16 may be impressed upon the input of tube 18, constituting detector and A. V. C. tube, which may be a tube of type 1LH4, having cathode $18c$, control electrode $18g$, triode-anode $18a_1$, and diode-anode $18a_2$.

Resistance R8 may be connected between control grid of control electrode $18g$ and ground, and condenser C12 may be connected from the high side of R8 to a variable point on R7, and anode $18a_1$ may be connected through resistance R3 to +B. A. V. C. voltage may be derived from the common point of resistance R7 and inductance $17s$, and may be applied through resistance R6 to the control grid of tube 14. The audio frequency voltage in the output of tube 18 may be applied to the final output tube 19 through condenser C13. C11 may be the R. F. by-pass condenser from the high side of R7 to cathode 18c.

The output tube may comprise cathode 19c, control electrode $19g_1$, screen $19g_2$, suppressor $19g_3$, and anode $19a$. The control electrode $19g_1$ may be connected through condenser C13 to anode $18a_1$ and through resistance R9 to —B. The screen may be connected to +B and the suppressor to cathode. Anode $19a$ may be connected through primary $20p$ of audio transformer 20 and to +B, and through condenser C14 to ground. Secondary $20s$ of transformer 20 may be connected to suitable loud speaker 21.

In operation, incoming signals are heterodyned and detected in the first tube, amplified at intermediate frequency in the second tube, detected in the third tube, and amplified at audio frequency in the fourth tube, and in operation, except for the features of compensation already described, the receiver is conventional and requires no further description.

It will be understood that, while I have shown my invention as applied to a superheterodyne, it may equally well be applied to receivers of the T. R. F. type, the compensation being applied to one or more of the radio frequency and audio frequency amplifiers, and it will also be understood that, while in the present instance I have shown a superheterodyne employing only one stage of intermediate frequency amplification, this is merely for the sake of simplicity, and it will be understood that more than one stage may be employed if desired, and that the compensation herein described may be applied to more than one intermediate frequency stage and to one or more of the audio frequency stages; also, the compensation and A. V. C. voltages may be interchanged, the compensation being applied to the converter, and A. V. C. to the I. F. amplifier. Compensation may also be applied to the R. F. stages preceding the converter, if such are used.

While I have shown and described certain preferred embodiments of my invention, it will be understood that modifications and changes may be made without departing from the spirit and scope thereof, as will be clear to those skilled in the art.

In this application I have explained the principles of my invention and the best mode in which I have contemplated applying those principles, so as to distinguish my invention from other inventions; and I have particularly pointed out and distinctly claimed the part, improvement, or combination which I claim as my invention or discovery.

I claim:

1. Radio receiving apparatus comprising, in combination, a plurality of vacuum tubes including at least one amplifier operating at superaudible frequencies, each having a cathode, a control electrode, and an anode, said tubes being connected in cascade, a battery source for supplying B voltage connected to the anodes of said tubes, a non-linear resistance connected across said B battery, a voltage divider connected across said non-linear resistance, and means for impressing a portion of the voltage across said voltage divider upon said superaudible frequency amplifier as a bias.

2. Radio receiving apparatus, comprising, in combination, a plurality of vacuum tubes including at least one amplifier operating at superaudible frequencies, each having a cathode, a control electrode, and an anode, said tubes being connected in cascade, a battery source for supplying B voltage connected to the anodes of said tubes, a resistance in the negative lead of said battery, a direct current voltage connection for impressing the voltage drop across said resistance as a bias on at least one of said tubes, a pair of resistances connected in series across said battery, one of said resistances having a non-linear voltage-current characteristic, and means for impressing a portion of the voltage drop in said non-linear resistance upon said superaudible frequency amplifier as a bias.

3. Radio receiving apparatus comprising, in combination, a plurality of vacuum tubes including at least one amplifier operating at superaudible frequencies, each having a cathode, a control electrode, and an anode, said tubes being connected in cascade, a battery source for supplying B voltage connected to the anodes of said tubes, a resistance in the negative lead of said battery, a direct current voltage connection for impressing the voltage drop across said resistance as a bias on at least one of said tubes, a pair of resistances connected in series across said battery, one of said resistances having a non-linear voltage-current characteristic, a voltage divider connected across said non-linear resistance, and means for impressing a portion of the voltage drop across said voltage divider upon said superaudible frequency amplifier as a bias.

4. Radio receiving apparatus comprising, in combination a plurality of vacuum tubes including at least one amplifier operating at superaudible frequencies, each having a cathode, a control electrode, and an anode, said tubes being connected in cascade, a battery source for supplying B voltage connected to the anodes of said tubes, a non-linear resistance containing silicon carbide connected across said B battery, a voltage divider connected across said non-linear resistance, and means for impressing a portion of the voltage across said voltage divider upon said superaudible frequency amplifier as a bias.

5. Radio receiving apparatus comprising, in combination, a plurality of vacuum tubes including at least one amplifier operating at superaudible frequencies, each having a cathode, a control electrode, and an anode, said tubes being connected in cascade, a battery source for supplying B voltage connected to the anodes of said tubes, a resistance in the negative lead of said battery, a direct current voltage connection for impressing the voltage drop across said resistance as a bias on at least one of said tubes, a pair of resistances connected in series across said battery, one of said resistances containing silicon carbide and having a non-linear voltage-current characteristic, and means for impressing a portion of the voltage drop in said non-linear resistance upon said superaudible frequency amplifier as a bias.

6. Radio receiving apparatus comprising, in combination, a plurality of vacuum tubes including at least one amplifier operating at superaudible frequencies, each having a cathode, a control electrode, and an anode, said tubes being connected in cascade, a battery source for supplying B voltage connected to the anodes of said tubes, a resistance in the negative lead of said battery, a direct current voltage connection for impressing the voltage drop across said resistance as a bias on at least one of said tubes, a pair of resistances connected in series across said battery, one of said resistances containing silicon carbide and having a non-linear voltage-current characteristic, a voltage divider connected across said non-linear resistance, and means for impressing a portion of the voltage drop across said voltage divider upon said superaudible frequency amplifier as a bias.

MADISON G. NICHOLSON, JR.

REFERENCES CITED

The following references are of record in the file of this patent:

UNITED STATES PATENTS

| Number | Name | Date |
| --- | --- | --- |
| 1,942,234 | Beers | Jan. 2, 1934 |
| 2,025,400 | Ring | Dec. 24, 1935 |
| 2,151,829 | Barton | Mar. 28, 1939 |
| 2,171,638 | Zepler | Sept. 5, 1939 |
| 2,228,112 | Hansell | Jan. 7, 1941 |
| 2,259,121 | Temple | Oct. 14, 1941 |
| 2,364,238 | Nicholson, Jr. | Dec. 5, 1944 |

OTHER REFERENCES

Ser. No. 393,526, Moser (A. P. C.) pub. May 18, 1943.